US007672464B2

(12) United States Patent
Bianchi et al.

(10) Patent No.: US 7,672,464 B2
(45) Date of Patent: Mar. 2, 2010

(54) LOCATING AND CORRECTING UNDESIRABLE EFFECTS IN SIGNALS THAT REPRESENT TIME-BASED MEDIA

(75) Inventors: Curt Bianchi, Saratoga, CA (US); Nikhil Bhatt, Cupertino, CA (US); Christopher Moulios, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 68 days.

(21) Appl. No.: 11/636,429

(22) Filed: Dec. 8, 2006

(65) Prior Publication Data

US 2007/0135954 A1    Jun. 14, 2007

Related U.S. Application Data

(63) Continuation of application No. 10/407,900, filed on Apr. 4, 2003, now Pat. No. 7,319,761.

(51) Int. Cl.
*H04R 29/00* (2006.01)
*H03G 7/00* (2006.01)
*G06F 17/00* (2006.01)
*G06F 3/00* (2006.01)
*G06F 3/16* (2006.01)

(52) U.S. Cl. .......................... 381/56; 381/106; 700/94; 715/716; 715/727

(58) Field of Classification Search .................. 381/56, 381/106, 94.8, 94.3; 704/503; 715/727, 715/716; 700/94
See application file for complete search history.

(56) References Cited

U.S. PATENT DOCUMENTS

| 4,398,061 | A | | 8/1983 | McMann, Jr. |
| 6,055,495 | A | * | 4/2000 | Tucker et al. ............... 704/210 |
| 6,192,183 | B1 | * | 2/2001 | Taniguchi et al. ............ 386/52 |
| 6,403,871 | B2 | * | 6/2002 | Shimizu et al. ............... 84/622 |
| 2003/0014135 | A1 | | 1/2003 | Moulios |
| 2004/0199277 | A1 | | 10/2004 | Bianchi et al. |

OTHER PUBLICATIONS

Higgins, D., "Wave Corrector v3.0 Vinyl/Tape to CD-R Processing Digital Audio Editing for the PC User Manual," Jul. 22, 2004, Ganymede Test & Measurement, v3.0, from < http://web.archive.org/web/20040722132002/www.wavecor.co.uk/help300.pdf > (86 pgs).

* cited by examiner

*Primary Examiner*—Vivian Chin
*Assistant Examiner*—Douglas J Suthers
(74) *Attorney, Agent, or Firm*—Hickman Palermo Truong & Becker LLP; Daniel D. Ledesma

(57) ABSTRACT

The invention describes a graphical method for detecting and adjusting audio overload conditions. The graphical user interface provides a user complete playback control of several audio tracks, detection of overload conditions such as audio clipping, and graphical methods to correct the overload conditions. The graphical interface provides drag handles which the user can use to adjust the various characteristics of an audio file. The characteristics, such as amplitude and tempo, may be adjusted as a function of time.

23 Claims, 4 Drawing Sheets

LOCATING AND CORRECTING UNDESIRABLE EFFECTS IN SIGNALS THAT REPRESENT TIME-BASED MEDIA

CROSS-REFERENCE TO RELATED APPLICATION

This application is a continuation of U.S. patent application Ser. No. 10/407,900 filed Apr. 4, 2003 now U.S. Pat. No. 7,319,761 which is incorporated herein by reference as fully set forth herein, under 35 U.S.C. §120.

FIELD OF THE INVENTION

This invention relates to the field of data processing. More specifically, this invention relates a method and apparatus for locating and correcting sound overload

BACKGROUND OF THE INVENTION

Audio streams recorded as music records, sounds of live scenes or speech may sometimes contain popping sounds. A popping sound is characterized by a short burst of high volume. It is usually introduced by faulty recording equipment, badly adjusted electronic equipment, static electricity or even incidents happening during the recording session (e.g. collisions with a microphone during the recording session). Popping sounds may also be introduced as side effects that accompany audio data processing using numerical methods. For example, a numerical manipulation of audio data may introduce square waveforms that are the origin of the appearance of high frequency spikes when the audio stream is passed through filters which are generally present in one form or another in playback devices.

Popping sounds are usually uncomfortable to the human ear. It is always desirable to remove popping sounds from audio streams, or at least attenuate their amplitude to a level that does not cause discomfort. A simple way of removing a popping sound from an audio stream is to reduce the amplitude of the audio stream at the location where the popping happens. The process may involve digitizing the audio data that can be used to locate high amplitude that surpasses a predetermined threshold, then correcting the amplitude at those locations.

Existing tools for manipulating audio data do not provide means to visually and easily identify the locations where the amplitude of an audio stream surpasses a comfortable level of listening, and allow the user to interactively alter the audio stream amplitudes at the affected locations.

Therefore, there is a need for a method for users to graphically indicate locations of audible overload conditions, automatically locate those locations, and allow the user to interactively alter the audio stream.

SUMMARY OF THE INVENTION

An embodiment of the invention is directed to a method and apparatus for locating overload conditions (e.g., clipping) in sound files and for graphically correcting the overload conditions. The user interface configured in accordance with an embodiment of the invention provides a display region that comprises a number of graphical components configured to assist the user with the process of determining at what point during playback of an audio file a sound overload condition occurred. When a sound overload condition is identified, users may then use one of the graphical components within the display region to jump to the point in the audio file where the abnormality exists. This enables users to quickly and efficiently locate and correct any sound overload conditions encountered during playback.

DETAILED DESCRIPTION

The present invention discloses a method and apparatus for locating overload conditions (e.g., clipping) in sound files and for graphically correcting the overload conditions. In the following description, numerous specific details are set forth to provide a more thorough description of the present invention. It will be apparent, however, to one skilled in the art, that the present invention may practiced without these specific details. In other instances, well known features have not been described in detail so as not to obscure the present invention.

Throughout this disclosure, any reference to a user may alternately refer to a person using a computer application and/or to one or more automatic processes. The automatic processes may be any computer program executing locally or remotely, that communicates with embodiments of the invention, and that may be triggered following any predetermined event. In addition, audio abnormality as used herein generally refers to saturation of the dynamic range of an audio output device. Abnormality thus encompasses saturation and its effects on the resulting audio output.

Figure 1:
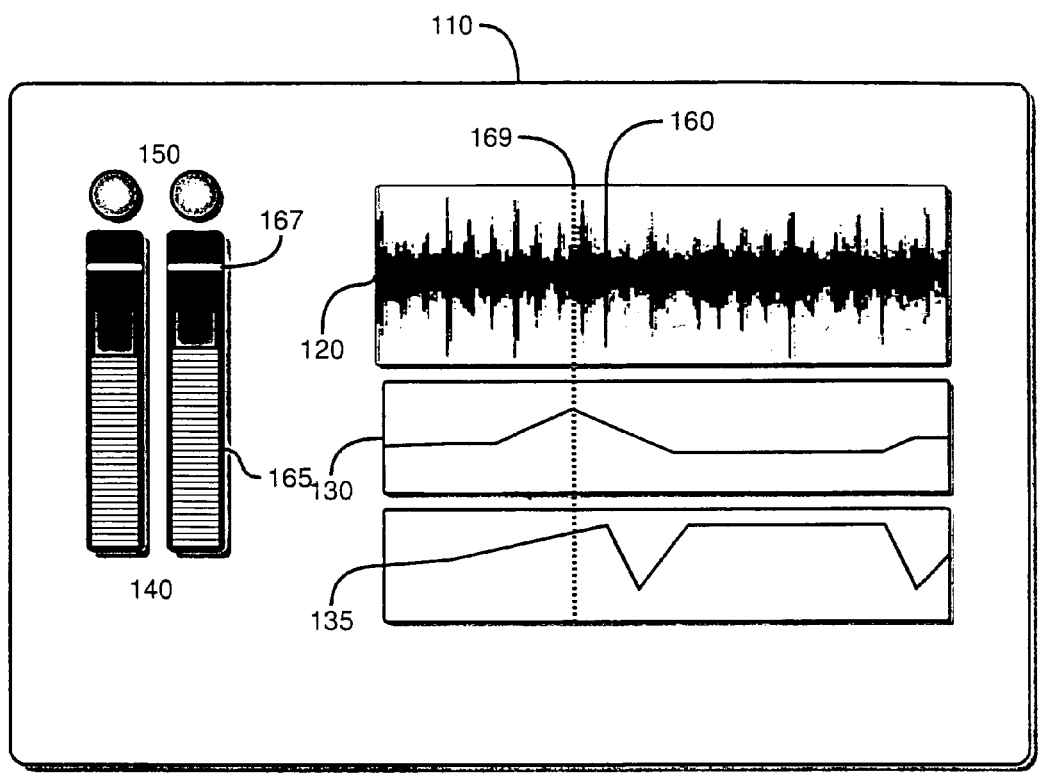
FIG. 1 is a block diagram that represents the overall layout of components of a graphical user interface utilized in embodiments of the invention.

FIG. 1 is a block diagram that represents the overall layout of components of a graphical user interface utilized in embodiments of the invention. One or more graphical user interface (GUI) components (e.g. 120, 130, 140 and 150) are presented in one or more display areas (e.g. 110: a panel, a layout container or a graphical window). A system embodying the invention comprises one or more audio data display components 120. An audio data display component 120 allows easy access (e.g. through a screen pointer) to audio data for editing and viewing using several techniques for viewing data. For example, component 120 allows a user to zoom in (and out) on portions (or the entirety) of the audio data. Component 120 also allows a user to copy portions of the data from any position of the audio stream and insert it in any other position of the audio stream.

Embodiments of the invention comprise one or more audio properties display areas (e.g. 130 and 135). A property display area displays one or more audio properties. For example, area 130 may display the volume of the audio represented as a time function plotted along with the audio signal displayed in 120. Other areas may display properties such as gain, one or more filter properties and any other property that may be applied locally to a signal in a time dependent fashion. In the example, of FIG. 1 an audio cursor 169 allows a user to interactively select a position in the audio stream. The cursor may be utilized in combination with the click of a screen pointer to select portions of the audio data and/or portions of one or more properties. One of the cursors may also be used to follow the status of the audio data during playback or recording.

The system comprises other type of GUI components for visualizing the status of the audio data during playback and/or recording. For example, components 140 of FIG. 1 show two (2) vertical bars for viewing the activity of two separate stereo channels of an audio stream. The vertical bars utilize one or more visual cues to indicate the status of the audio data. Cues comprise the height of a scale (e.g. 165), the color of the scale or of individual rows in the scale, indicating different levels of activity in the audio signal. Components 140 may have one or more indicators 167 that show historical values of one or more properties. For example, one or more indicators (e.g. 167) may point to the maximum, minimum or average values of the audio data during playback.

A system implementing the invention is capable of detecting overload conditions in an audio data stream. The GUI provides display components to visually alert the user when such overload conditions are detected in the audio signal. For example, components 150 of FIG. 1 may represent colored buttons that change the color and/or the intensity of the light emitted by the screen component. When the system detects audio overload conditions it may send audio alerts, in addition to visual cues.

In one embodiment of the invention, status components 140 displays representation of the volume of the sound during playback. The scale 165 represents the instantaneous sound volume for each one of the stereo channels, and changes its color as the level of the volume rises. The indicators 167 indicate the highest volume level ever reached from the start of the audio playback (or recording) to the current position. When the system detects an audio overload condition (e.g. in the form of a saturation level, 160), one or both components 150 light up. A user may utilize an appropriate interface control at any time to jump directly to the location of the audio signal that contains the abnormality (i.e. exceedance of the dynamic range of the audio output device).

The invention provides many other graphical components that allow a user to access, view and edit audio data and their properties. For example, the system has one or more access push buttons that allow a user to automatically jump to the location of the abnormality when the system detects such abnormality. The invention also enables the user to interactively modify the audio properties by manipulating screen widgets (e.g. inside 130 and/or 135). The system registers such changes brought by the user and applies them to the audio signal at playback.

Figure 2:
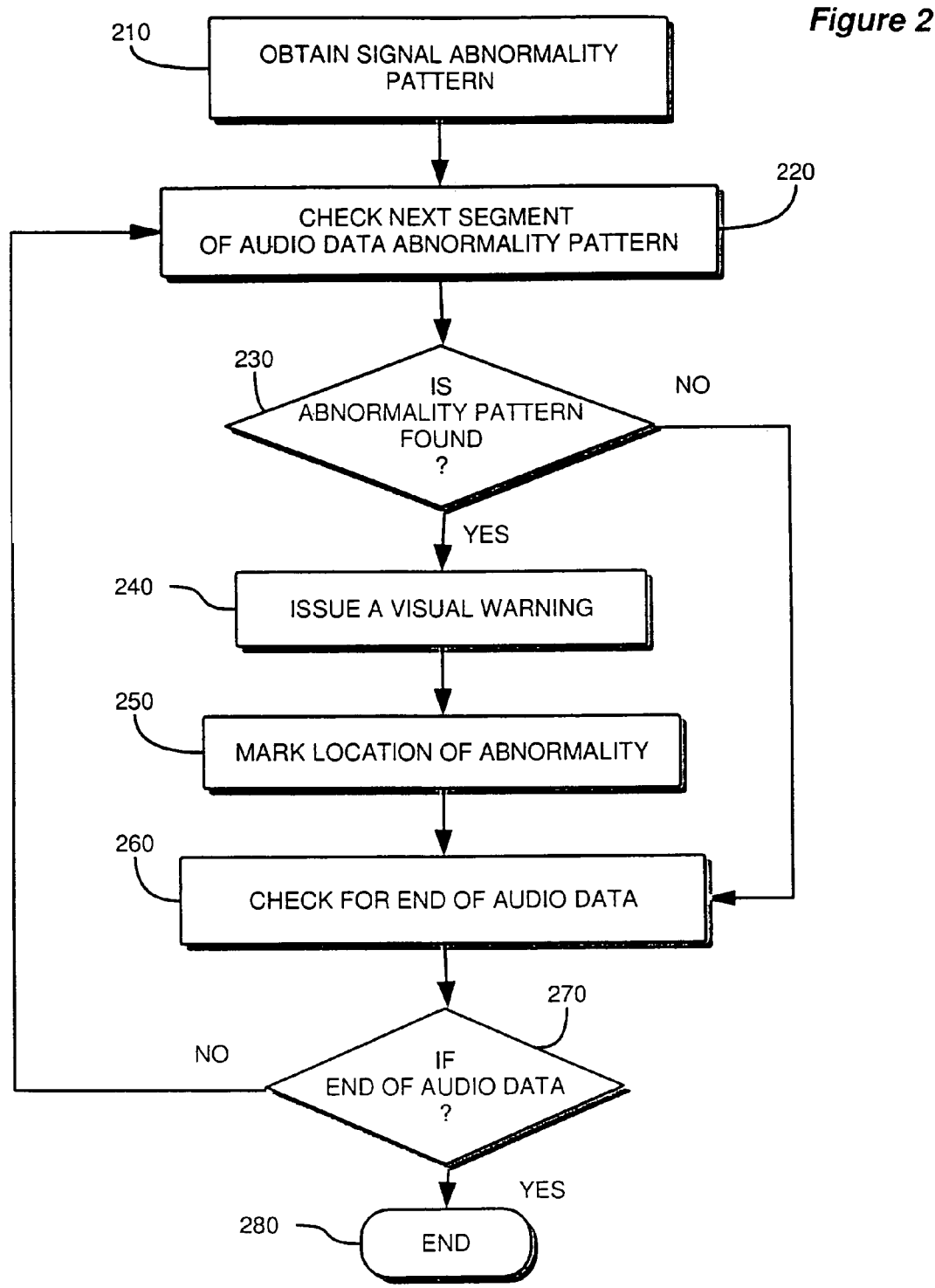
FIG. 2 is a flowchart that illustrates steps involved in the process of detecting overload conditions in audio data in embodiments of the invention.

FIG. 2 is a flowchart that illustrates steps involved in the process of detecting overload conditions in audio data in embodiments of the invention. A system embodying the invention obtains an abnormality pattern at step 210, e.g., sound pressure level limit corresponding to the dynamic range of the output device. An abnormality is typically an undesirable audible sound feature resulting from saturation and thus clipping or wrap of the resulting audio output. Audible overload conditions may arise from a number of sound manipulations or recording conditions. For example, during the recording, overload conditions may be introduced accidentally due to faulty electrical connections or static electricity. Another type of overload conditions are introduced by the recording equipment, for instance recordings made using old technologies (e.g. Vinyl disks records) usually contain a recognizable cracking sound.

Overload conditions may be defined through a description of the waveform, or using a spectral analysis based description. For example, some overload conditions may be due to specific frequencies introduced by electric (or acoustic) resonance. In the latter case, it may be possible to define the pattern as the frequency (or a pattern of frequencies) that cause the audible effect. The system runs through the audio signal and checks each audio segment for the abnormality patterns (e.g. at step 220). When the system finds a location that matches the abnormality pattern (e.g. at step 230) it issues one or more warnings to the user through the user interface described above (e.g. at step 240). As stated above, the system may blink the light (or change the brightness) of one or more screen widgets (e.g. 150) to indicate that the system has detected the abnormality pattern. The system records the location of every abnormality found in the audio data (e.g. at step 250) and proceeds to analyze the rest of the audio data. The system checks whether it has reached the end of the audio data (e.g. at step 260). When the test (e.g. at step 270) indicates the end of the audio data, the system returns a visual status and waits for user input (e.g. at step 280), otherwise the system continues to check the next segment of the audio data (e.g. at step 220).

Figure 3:
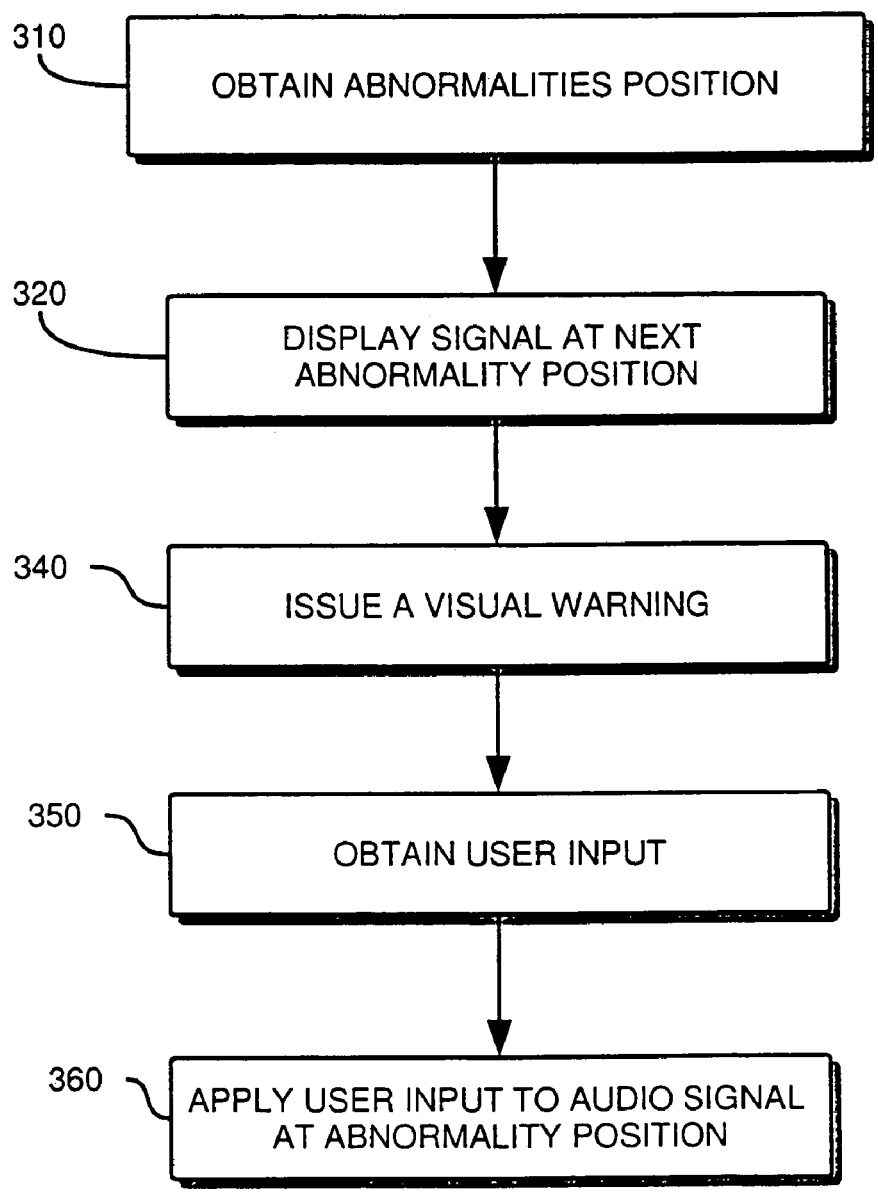
FIG. 3 is a flowchart that illustrates steps involved in the process by which a system embodying the invention allows a user to access and correct overload conditions in audio data.

FIG. 3 is a flowchart that illustrates steps involved in the process by which a system embodying the invention allows a user to access and correct overload conditions in audio data. When the user issues a command to find overload conditions in audio data, the system either runs a process that checks for matches for the abnormality pattern described above, or simply retrieves the position of matches (e.g. at step 310) found at one or more previous runs. When a position is found (or retrieved) the system displays the portion of the signal (e.g. at step 320) in a signal display area (e.g. 120) and displays, in one or more property display areas (e.g. 130 and 135), one or more signal properties (e.g. volume, gain etc.) corresponding to the displayed portion of the audio signal. The system may display one or more cursors that indicate the exact position of the abnormality. In addition, the system issues a visual warning (e.g. at step 340), by activating one or more GUI components (e.g. 150).

When the system finds an abnormality, it prepares the interface to accept user input to apply modifications to the audio signal's properties. The user may utilize one or more GUI components to modify the audio property at the location of an abnormality (e.g. at step 350). For example, when the abnormality is a popping (or a clicking) sound in the audio, the signal displays an abnormally high amplitude of the waveform at the location of the popping sound. The user, in the latter example, may utilize a screen widget to modify the volume at the precise location of the popping sound. The system obtains user input (e.g. at step 350), and applies the modification to the audio signal (e.g. at step 360), by changing the audio data, or by storing the property modifications along with the rest of the data.

Figure 4:
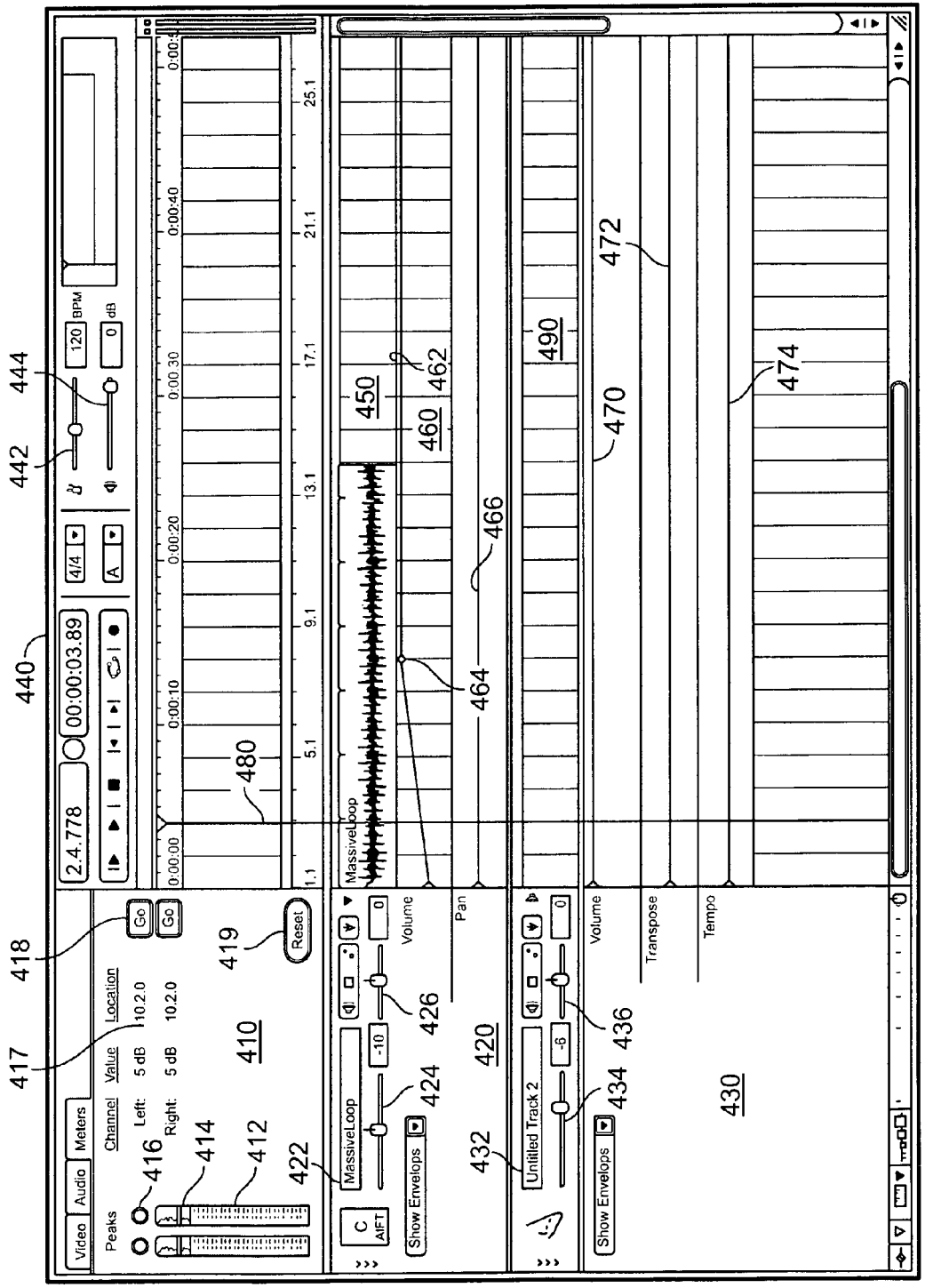
FIG. 4 is an illustration of a graphical user interface (GUI) in accordance with an embodiment of the present invention.

FIG. 4 is an illustration of a graphical user interface (GUI) in accordance with an embodiment of the present invention. The GUI of FIG. 4 comprises activity display window 410, master-playback control window 440, first graphical audio data display window 450, data manipulation window 460, first audio control window 420, second audio control 430, second graphical audio data display window 490, data manipulation window 470, and audio cursor 480.

Activity display window 410 comprises depth meters 412, maximum decibel level indicators 414, indicator lights 416, numerical display 417, control buttons 418, and Reset button 419. Depth meters 412 provide visual displays of the sound amplitude levels in each stereo channel during playback. For instance, the left meter is a visual indication of the sound level in the left stereo channel while the right indicator is a visual indication of the sound level in the right stereo channel. The scaling of each depth meter is such that the full scale is where sound clipping occurs. For instance, the full scale may represent a sound threshold set by the user.

The full scale may also be limited by maximum word size used to represent the audio output device. This threshold is sometimes referred to as the clipping level. Note that embodiments of these indicators may be built into the GUI or could be external meters connected to a computer that is processing the audio file. Furthermore, a practitioner may omit these indicators entirely since it is possible to practice the invention without them. However, the visual indication provides a warm-fuzzy of the playback activity to a user.

Numerical display area 417 shows the maximum decibel value detected during playback and its location in the track. Indicators 414 also provide visual indication of the maximum decibel level, one for each stereo channel, which occurs in each channel during playback. For instance, if during playback the decibel level reaches minus five (−5) dB on the left stereo channel, the maximum decibel level indicator 414 of the left channel will indicate a relative position of −5 dB and will remain at −5 dB even if the sound level subsequently drops down to below that level. However, if the sound level subsequently increases beyond the −5 dB level, the maximum level indicator will indicate the new higher level. Thus, the maximum level indicator will always show the maximum sound level attained during playback. Of course, the maximum sound level indicators will never show beyond the clipping level which is the maximum scale. Values above clipping are indicated at numerical display area 417 and by color change of indicator lights 416.

Indicator lights 416 will light up (e.g., red) any time the respective channel reaches or exceeds the sound threshold level set for clipping. The sound threshold level for clipping is usually the dynamic range of the audio output device thus is output device dependent. For example, output devices like CDs may have a 24-bit output resolution. In the digital processing world, the 24 bits will represent a certain sound pressure level. Of course the sound pressure level and the output device resolution will depend on the application. Since there is a sound pressure level corresponding to the output device bit size, any sound pressure level that reaches the maximum value set for the output device will saturate the device. Thereafter, sound pressure levels above the output device limit, e.g. 24-bit value, will overflow the output device.

In one embodiment, Indicator lights 416 may be configured as momentary indicators thus indicating exceedance of the threshold (i.e., clipping) level during playback. Indicator lights 416 will thus show when clipping occurs. Note that clipping occurs when the amplitude ratio of the audio exceeds the output device saturation limit during playback.

Master Playback control window 440 comprises buttons usable for controlling playback of the audio track under review. For instance, playback control window 440 may include a play/pause button, fast/jump forward button, rewind/return to start button, etc. Other control buttons may be added as needed. Playback control 440 controls playback of all audio files in the project. For instance, audio file "MassiveLoop.aif" in window 422 and "Untitled Track 2" in window 432. Controls 442 and 444 in master playback control window 440 controls the beat and gain level of the audio project. Note that each track being processed in the project, e.g., "MassiveLoop.aif" in window 422, has its own dedicated gain and tempo controls. For example, the overall gain and tempo controls for "MassiveLoop.aif" are controls 424 and 426, respectively. And the overall gain and tempo controls for "Untitled Track 2" are controls 434 and 436, respectively.

The waveform for "MassiveLoop.aif" is shown in window 450 and its volume control gain is shown as a function of time in window 460. To adjust the volume as a function of time, a user clicks on waveform 462 to expose the drag control handles 464 at or near the click point. The user may then adjust the gain either up or down using the drag control handles, e.g., 464. In similar manner, pan waveform 466 adjusts the left and right audio volume. Similarly, time dependent adjustments for volume 470, tempo 474, and transpose 472 are possible for the second audio track "Untitled Track 2" using the click and drag method described above. Note that additional audio tracks may be added as necessary with similar controls.

After playback, a user may use Go buttons 418 to advance cursor 480 to the next location where clipping was detected. The top Go button may control the left stereo channel and the bottom Go button may control the right stereo channel, for example. Reset button 419 provides quick reset of all the indicators, e.g., indicator light 416 and numerical display values 417 since these indicators latch when clipping is detected.

Thus, a method and apparatus for locating and resolving sound overload conditions has been described. Particular embodiments described herein are illustrative only and should not limit the present invention thereby. The invention is defined by the claims and their full scope of equivalents.

What is claimed is:

1. A non-transitory computer-readable storage medium storing one or more sequences of instructions which, when executed by one or more processors, causes the one or more processors to perform the steps of:
   analyzing a particular signal in a file to locate, within the particular signal, one or more portions of the particular signal that satisfy certain criteria, wherein the certain criteria includes presence of one or more undesirable effects, and wherein the file particular signal is an audio signal;
   presenting, to a user, a graphical user interface that (1) displays location information of the one or more portions and (2) includes controls that allow the user to modify the particular signal at each of the one or more portions;
   receiving user input that specifies a particular portion of the one or more portions and a change to be made to the particular portion; and
   after receiving the user input, making the change to the particular portion of the particular signal to remove the undesirable effect that corresponds to the particular portion from the particular signal.

2. The non-transitory computer-readable storage medium of claim 1, wherein:
   the certain criteria include an overload condition; and
   the one or more portions correspond to audio that has characteristics that satisfy the overload condition.

3. The non-transitory computer-readable storage medium of claim 2, wherein the one or more portions satisfy the overload condition by having signal amplitudes that register above a predetermined threshold.

4. The non-transitory computer-readable storage medium of claim 1, wherein the change is at least one of a change to the amplitude of the signal at the particular portion or a change to a time value associated with the particular portion.

5. A method comprising the steps of:
   analyzing a particular signal in a file to locate, within the particular signal, one or more portions of the particular signal that satisfy certain criteria, wherein the certain criteria includes presence of one or more undesirable effects, and wherein the particular signal is an audio signal;
   presenting, to a user, a graphical user interface that (1) displays location information of the one or more portions and (2) includes controls that allow the user to modify the particular signal at each of the one or more portions;
   receiving user input that specifies a particular portion of the one or more portions and a change to be made to the particular portion; and
   after receiving the user input, making the change to the particular portion of the particular signal to remove the undesirable effect that corresponds to the particular portion from the particular signal;
   wherein the steps are performed on one or more computing devices.

6. The method of claim 5, wherein:
   the certain criteria include an overload condition; and
   the one or more portions correspond to audio that has characteristics that satisfy the overload condition.

7. The method of claim 6, wherein the one or more portions satisfy the overload condition by having signal amplitudes that register above a predetermined threshold.

8. The method of claim 5, wherein the change is at least one of a change to the amplitude of the signal at the particular portion or a change to a time value associated with the particular portion.

9. An apparatus comprising:
   a display configured to graphically represent a particular signal that is an audio signal;
   a processor configured to analyze the particular signal to identify portions of the particular signal that satisfy certain criteria, wherein the certain criteria includes presence of one or more undesirable effects;
   a memory in which locations of the portions are stored; and
   a user interface, generated as part of the display, that visually depicts the locations of the portions, wherein the user interface comprises one or more graphical controls for adjusting the particular signal at each location, wherein at least one undesirable effect that corresponds to each location is removed from the particular signal as a result of adjusting the particular signal.

10. The apparatus of claim 9, wherein:
    the certain criteria include an overload condition; and
    the portions correspond to audio that has characteristics that satisfy the overload condition.

11. The apparatus of claim 10, wherein the portions satisfy the overload condition by having signal amplitudes that register above a predetermined threshold.

12. The apparatus of claim 9, wherein adjusting the signal at each location includes at least one of adjusting to the amplitude of the signal at said each location or adjusting a time value associated with said each location.

13. An apparatus comprising:
    one or more processors;
    one or more stored sequences of instructions which, when executed by the one or more processors, cause the one or more processors to perform the steps of:
       analyzing an audio file to locate, within the audio file, one or more locations that correspond to audio that has characteristics that satisfy overload conditions;
       storing location information that represents said one or more locations;
       maintaining position data that indicates a current position within the audio file;
       in response to user input:
          reading said location information to identify a particular location of said one or more locations;
          modifying the position data to cause said current position to be said particular location; and
          presenting to said user one or more controls that allow said user to modify the audio data at said particular location.

14. The apparatus of claim 13, wherein audio that has characteristics that satisfy overload conditions includes audio having an abnormal signal amplitude.

15. The apparatus of claim 13, wherein audio that has characteristics that satisfy overload conditions includes audio with a signal amplitude registering above a predetermined threshold.

16. The apparatus of claim 13, wherein said instructions include instructions which, when executed by the one or more processors, further cause the one or more processors to perform the step of:
    in response to locating a particular location within the audio file that corresponds to audio that has characteristics that satisfy overload conditions, presenting a visual indicator of said particular location within said audio file to the user.

17. The apparatus of claim 13, wherein said instructions include instructions which, when executed by the one or more processors, further cause the one or more processors to perform the step of:
    providing said user one or more controls for automatically navigating between said one or more locations.

18. The apparatus of claim 13, wherein presenting to said user one or more controls includes providing one or more drag handles configured to adjust at least one characteristic of said audio file.

19. The apparatus of claim 18, wherein said drag handles are configured to adjust an amplitude at said particular location.

20. The apparatus of claim 18, wherein said drag handles are configured to adjust a time value at said particular location.

21. The apparatus of claim 13, wherein said instructions include instructions which, when executed by the one or more processors, further cause the one or more processors to perform the steps of:
    in response to user input:
       reading said location information to identify a new location of said plurality of locations, and
       modifying the position data to cause said current position to be said new location.

22. The apparatus of claim 13, wherein analyzing the audio file includes:
    playing the audio file back to the user; and
    in response to locating a particular location within the audio file that corresponds to audio that has characteristics that satisfy overload conditions, presenting a visual indicator to the user.

23. The apparatus of claim 13, wherein analyzing the audio file includes:
    playing the audio file back to the user; and
    in response to locating a particular location within the audio file that corresponds to audio that has characteristics that satisfy overload conditions, causing a audible alert to be presented to the user.

* * * * *

UNITED STATES PATENT AND TRADEMARK OFFICE
CERTIFICATE OF CORRECTION

| | | |
|---|---|---|
| PATENT NO. | : 7,672,464 B2 | |
| APPLICATION NO. | : 11/636429 | |
| DATED | : March 2, 2010 | |
| INVENTOR(S) | : Curt Bianchi et al. | |

It is certified that error appears in the above-identified patent and that said Letters Patent is hereby corrected as shown below:

In column 1, line 17, after "overload" insert -- . --.

In column 7, line 45, in Claim 9, delete "a a result" and insert -- a result --, therefor.

Signed and Sealed this
Twenty-second Day of November, 2011

David J. Kappos
*Director of the United States Patent and Trademark Office*